US009785295B2

(12) United States Patent
Yang et al.

(10) Patent No.: US 9,785,295 B2
(45) Date of Patent: Oct. 10, 2017

(54) TOUCH SCREEN CONTROL METHOD AND DEVICE

(71) Applicant: Xiaomi Inc., Beijing (CN)

(72) Inventors: Kun Yang, Beijing (CN); Bo Zhang, Beijing (CN); Xiang Xiao, Beijing (CN)

(73) Assignee: Xiaomi Inc., Beijing (CN)

( * ) Notice: Subject to any disclaimer, the term of this patent is extended or adjusted under 35 U.S.C. 154(b) by 239 days.

(21) Appl. No.: 14/585,687

(22) Filed: Dec. 30, 2014

(65) Prior Publication Data

US 2015/0346864 A1  Dec. 3, 2015

Related U.S. Application Data

(63) Continuation of application No. PCT/CN2014/089256, filed on Oct. 23, 2014.

(30) Foreign Application Priority Data

May 30, 2014 (CN) .......................... 2014 1 0238770

(51) Int. Cl.
*G06F 3/044* (2006.01)
(52) U.S. Cl.
CPC .................................. *G06F 3/044* (2013.01)
(58) Field of Classification Search
CPC ...................................................... G06F 3/044
See application file for complete search history.

(56) References Cited

U.S. PATENT DOCUMENTS

| 8,482,546 | B2 | 7/2013 | Chai et al. |
| 8,976,146 | B2 | 3/2015 | Hsu et al. |
| 2011/0175835 | A1 | 7/2011 | Wang |
| 2012/0075245 | A1 | 3/2012 | Chang et al. |
| 2012/0216139 | A1 | 8/2012 | Ording et al. |

(Continued)

FOREIGN PATENT DOCUMENTS

| CN | 101840293 | 9/2010 |
| CN | 101861562 | 10/2010 |

(Continued)

OTHER PUBLICATIONS

International Search Report issued by the State Intellectual Property Office (SIPO) of the People's Republic of China on Feb. 10, 2015, in PCT International Application No. PCT/CN2014/089256.

(Continued)

*Primary Examiner* — Andrew Sasinowski
(74) *Attorney, Agent, or Firm* — Finnegan, Henderson, Farabow, Garrett & Dunner LLP

(57) ABSTRACT

A touch screen control method and device are provided. The method includes acquiring a plurality of actual capacitance values of respective test points on a touch screen, identifying the interference level of an electrically conductive liquid according to differences between the actual capacitance values and a plurality of reference capacitance values of the respective test points, and controlling the touch screen under an operation mode corresponding to the interference level. The reference capacitance values are capacitance values of the respective test points when the test points are not influenced by an electrically conductive medium.

14 Claims, 5 Drawing Sheets

(56) References Cited

U.S. PATENT DOCUMENTS

| | | |
|---|---|---|
| 2012/0249476 A1 | 10/2012 | Schwartz et al. |
| 2013/0038573 A1 | 2/2013 | Chang et al. |
| 2013/0175153 A1 | 7/2013 | Chang |
| 2013/0176268 A1 | 7/2013 | Li et al. |
| 2013/0249837 A1 | 9/2013 | Liu et al. |
| 2013/0278521 A1 | 10/2013 | Kim |
| 2013/0278543 A1* | 10/2013 | Hsu .................. G06F 3/044 345/174 |
| 2014/0111430 A1* | 4/2014 | Shima .................. G06F 3/044 345/157 |
| 2014/0327629 A1 | 11/2014 | Jobs et al. |
| 2015/0077394 A1 | 3/2015 | Dai et al. |

FOREIGN PATENT DOCUMENTS

| | | |
|---|---|---|
| CN | 102221946 A | 10/2011 |
| CN | 102968235 | 3/2013 |
| CN | 103019483 | 4/2013 |
| CN | 103197787 | 7/2013 |
| CN | 103324373 | 9/2013 |
| CN | 103324430 | 9/2013 |
| CN | 103366138 | 10/2013 |
| CN | 103376963 | 10/2013 |
| CN | 103562829 A | 2/2014 |
| CN | 104063101 A | 9/2014 |
| JP | 2012-123740 | 6/2012 |
| JP | 2013125496 A | 6/2013 |
| JP | 2013-222283 | 10/2013 |
| JP | 2013-257908 | 12/2013 |
| KR | 20120065233 | 6/2012 |
| RU | 2363991 | 8/2009 |
| TW | 201329824 A | 7/2013 |

OTHER PUBLICATIONS

Extended European Search Report of EP Application No. 15169399.1, mailed Oct. 21, 2015, issued by the European Patent Office (8 pages).

Notification on the Results of Patentability Check for Russian Application No. 2014154249/08(086693), dated Mar. 25, 2016.

English version of International Search Report issued by the State Intellectual Property Office (SIPO) of the People's Republic of China on Feb. 10, 2015, in PCT International Application No. PCT/CN2014/089256.

* cited by examiner

TOUCH SCREEN CONTROL METHOD AND DEVICE

CROSS-REFERENCE TO RELATED APPLICATIONS

This application is a Continuation Application of International Application No. PCT/CN2014/089256, filed Oct. 23, 2014, which is based upon and claims priority to Chinese Patent Application No. 201410238770.X, filed May 30, 2014, the entire contents of all of which are incorporated herein by reference.

TECHNICAL FIELD

The present disclosure generally relates to the field of touch screen technology and, more particularly, to a method and a device for controlling a touch screen.

BACKGROUND

With the rapid development of touch screen technology, electronic equipment using a touch screen has been widely used. Touch screens are mainly classified into a pressure sensing touch screen, a resistive touch screen, a capacitive touch screen, an infrared touch screen, a surface acoustic wave touch screen, and the like. Among these touch screens, the capacitive touch screen is generally the most widely used touch screen.

The capacitive touch screen includes transversal and longitudinal electrode arrays made from Indium Tin Oxide (ITO). The transversal and longitudinal electrode arrays constitute a plurality of test points uniformly distributed on the screen surface. Because self-capacitance can be generated between adjacent electrodes, single-point touch detection can be realized via collecting changes of self-capacitance values of the test points by self-capacitance scanning. In addition, because mutual capacitance can also be generated between adjacent electrodes, multi-point touch detection can be realized via collecting changes of mutual capacitance values of the test points by mutual capacitance scanning.

SUMMARY

According to a first aspect of the present disclosure, there is provided a touch screen control method, including: acquiring a plurality of actual capacitance values of respective test points on a touch screen; determining an interference level of an electrically conductive liquid according to differences between the actual capacitance values and a plurality of reference capacitance values of the respective test points; and controlling the touch screen under an operation mode corresponding to the interference level. The reference capacitance values are capacitance values of the respective test points when the test points are not influenced by an electrically conductive medium.

According to a second aspect of the present disclosure, there is provided a touch screen control device, including a processor and a memory configured to store instructions executable by the processor. The processor is configured to perform: acquiring a plurality of actual capacitance values of respective test points on a touch screen; identifying an interference level of an electrically conductive liquid according to differences between the actual capacitance values and a plurality of reference capacitance values of the respective test points; and controlling the touch screen under an operation mode corresponding to the interference level. The reference capacitance values are capacitance values of the respective test points when the test points are not influenced by an electrically conductive medium.

According to a third aspect of the present disclosure, there is provided a non-transitory computer-readable storage medium having stored therein instructions that, when executed by a processor of a device, cause the device to perform a touch screen control method. The method includes acquiring a plurality of actual capacitance values of respective test points on a touch screen; identifying an interference level of an electrically conductive liquid according to differences between the actual capacitance values and a plurality of reference capacitance values of the respective test points; and controlling the touch screen under an operation mode corresponding to the interference level. The reference capacitance values are capacitance values of the respective test points when the test points are not influenced by an electrically conductive medium.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In exemplary embodiments, when a small amount of electrically conductive liquid, such as water, covers a surface of a touch screen, referred to hereafter as the touch screen surface, changes of self-capacitance values of the touch screen triggered by finger touch can be stably monitored by a chip, such as a touch integrated circuit (Touch IC). However, changes of mutual capacitance values of the touch screen triggered by finger touch may be difficult to be stably monitored by the Touch IC because the mutual capacitance values are influenced by the electrically conductive liquid. Therefore, when the touch screen surface is covered with the electrically conductive liquid or when the user's finger(s) touch the electrically conductive liquid, the touch screen can be controlled under a mode in which only changes of the self-capacitance values are monitored, so as to ensure single-point touch detection. To some extent, that can reduce the interference of the electrically conductive liquid on the sensitivity and detection precision of the touch screen, and ensure normal detection of single-finger operation such as clicking, sliding, and the like.

In the following embodiments, electronic equipment can be a mobile phone, a tablet computer, an ebook reader, a Moving Picture Experts Group Audio Layer III (MP3) player, a Moving Picture Experts Group Audio Layer IV (MP4) player, a laptop computer, a desktop computer, a smart television, and the like. The electronic equipment includes a touch screen, such as a capacitive touch screen, and the capacitive touch screen supports both self-capacitance scanning and mutual capacitance scanning.

Figure 1:
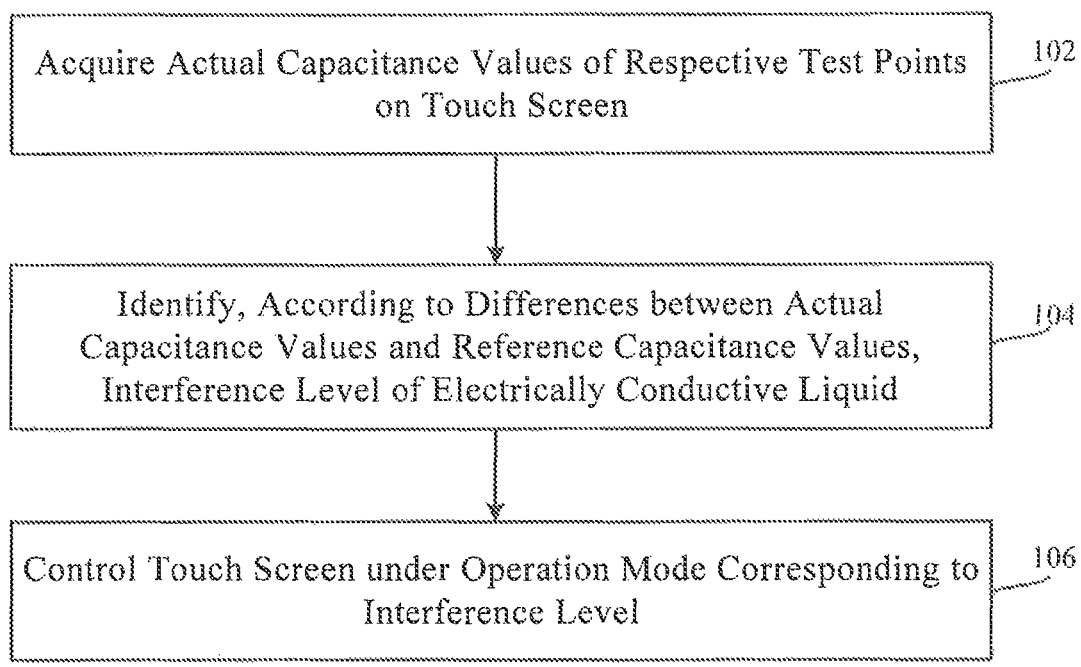
FIG. 1 is a flow chart of a touch screen control method, according to an exemplary embodiment.

FIG. 1 is a flow chart of a method 100 for controlling a touch screen of electronic equipment, according to an exemplary embodiment. Referring to FIG. 1, the method 100 includes the following steps.

In step 102, actual capacitance values of respective test points on the touch screen are acquired.

In step 104, an interference level of an electrically conductive liquid is identified according to differences between the actual capacitance values and a plurality of reference capacitance values of the respective test points. For example, the reference capacitance values can be acquired when the test points are not influenced by an electrically conductive medium.

In step 106, the touch screen is controlled in an operation mode corresponding to the interference level.

Figure 2:
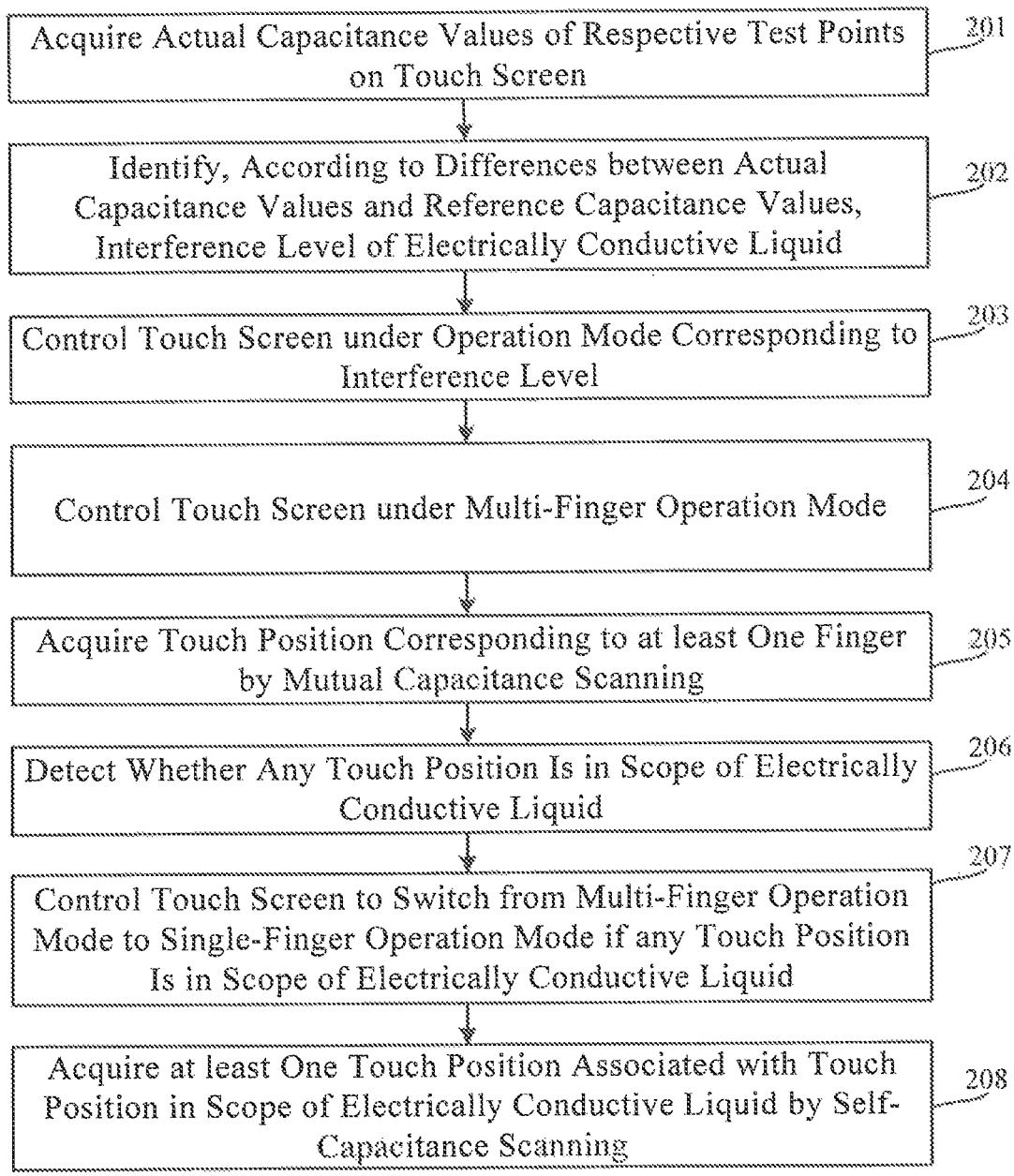
FIG. 2 is a flow chart of a touch screen control method, according to an exemplary embodiment.

FIG. 2 is a flow chart of a method 200 for controlling a touch screen of electronic equipment, according to an exemplary embodiment. Referring to FIG. 2, the method 200 includes the following steps.

In step 201, actual capacitance values of respective test points on the touch screen are acquired.

In exemplary embodiments, the test points on the touch screen each have an actual self-capacitance value and an actual mutual capacitance-value. The Touch IC can acquire the actual self-capacitance values and the actual mutual capacitance values of the test points by self-capacitance scanning and mutual capacitance scanning, respectively.

In step 202, an interference level of an electrically conductive liquid is identified according to differences between the actual capacitance values and a plurality of reference capacitance values of the respective test points.

In exemplary embodiments, the reference capacitance values include reference self-capacitance values and reference mutual capacitance values, corresponding to the actual self-capacitance values and the actual mutual capacitance values, respectively. As to a certain test point, the reference self-capacitance value of the test point refers to a self-capacitance value when the test point is not influenced by an electrically conductive medium, and the reference mutual capacitance value of the test point refers to a mutual capacitance value when the test point is not influenced by an electrically conductive medium. Examples of the electrically conductive medium include fingers, electrically conductive liquids, and any other electrically conductive materials that can change the capacitance values of the touch screen.

In exemplary embodiments, the Touch IC can determine whether an area covering a test point on the touch screen, referred to hereafter as the test point surface, is covered with an electrically conductive liquid based on whether the self-capacitance value and the mutual capacitance value of the test point are varied. Further, if the Touch IC determines that the test point surface is covered with an electrically conductive liquid, the Touch IC can determine a coverage amount of the electrically conductive liquid on the test point surface based on an amplitude of the variation of each of the self-capacitance value and the mutual capacitance value. Based on a result of the above determinations, the Touch IC can determine an actual coverage scope and an actual coverage amount of the electrically conductive liquid on the entire touch screen surface, and identify the interference level of the electrically conductive liquid based on the actual coverage scope and coverage amount.

In one exemplary embodiment, step 202 may include the following substeps.

In a first substep, it is detected whether each test point on the touch screen meets a predetermined condition.

For example, the predetermined condition includes the actual self-capacitance value of the test point is the same as the reference self-capacitance value of the test point; and the actual mutual capacitance value of the test point is different from the reference mutual capacitance value of the test point.

If the test point surface is covered with the electrically conductive liquid, generally, no obvious change of the self-capacitance value of the test point can be detected by using self-capacitance scanning, i.e., the detected actual self-capacitance value is very close to or even the same as the reference self-capacitance value. In contrast, an obvious change of the mutual capacitance value of the test point can be detected by using mutual capacitance scanning, i.e., the detected actual mutual capacitance value is greatly different from the reference mutual capacitance value. Taking advantage of this characteristic, the Touch IC can, on the basis of the variation of the self-capacitance value and the mutual capacitance value of a test point, determine whether the test point surface is covered with an electrically conductive liquid.

If the Touch IC only detects the variation of the mutual capacitance value of a test point by mutual capacitance scanning, the Touch IC will not be unable to identify whether the variation of the mutual capacitance value of the test point is caused by the coverage by the electrically conductive liquid or by finger touch. Besides, no obvious change of the self-capacitance value of the test point can be detected when the test point surface is covered with the electrically conductive liquid. On the other hand, an obvious change of the self-capacitance value of the test point can be detected when the test point surface is touched by finger. Therefore, the Touch IC can accurately determine whether the test point surface is covered with the electrically conductive liquid based on a combination of the variation of the self-capacitance value and the variation of the mutual capacitance value.

In a second substep, it is determined that, if a test point meets the predetermined condition, the test point surface is covered with the electrically conductive liquid, and according to the difference between the actual mutual capacitance value and the reference mutual capacitance value of the test point, the coverage amount of the electrically conductive liquid on the test point surface.

For example, the Touch IC determines that the test point surface is covered with the electrically conductive liquid if the test point meets the predetermined condition, and according to the amplitude of the variation of the mutual capacitance value, further determines the coverage amount of electrically conductive liquid on the surface of the test point. The difference between the actual mutual capacitance value and the reference mutual capacitance value is positively related to the coverage amount of electrically conductive liquid. Namely, the larger the amplitude of the variation of the mutual capacitance value, the more the coverage amount of the electrically conductive liquid is; and the smaller the amplitude of the variation of the mutual capacitance value, the less the coverage amount of electrically conductive liquid is.

In addition, it can be determined that the test point surface is not covered with an electrically conductive liquid if the test point does not meet the predetermined condition.

In a third substep, according to whether the surface of each test point is covered with the electrically conductive liquid and the coverage amount of the electrically conductive liquid on the surface of each of the test points that is covered with the electrically conductive liquid, the actual coverage scope and the actual coverage amount of the electrically conductive liquid on the touch screen surface are identified.

For example, after determining whether the surface of each test point is covered with the electrically conductive liquid and acquiring the coverage amount of the electrically conductive liquid on the surface of the test point that is covered with the electrically conductive liquid, the Touch IC integrates the aforementioned information so as to determine the actual coverage scope and coverage amount of the electrically conductive liquid on the whole touch screen surface.

In a fourth substep, according to the actual coverage scope and the coverage amount of the electrically conductive liquid on the touch screen surface, the interference level of the electrically conductive liquid is identified.

In the present embodiment, it is assumed that a first interference level, a second interference level, a third interference level, and a fourth interference level with increasing interference degrees are preset. Those skilled in the art can preset, for each interference level, numerical ranges of the actual coverage scope and the actual coverage amount corresponding to the interference level. The Touch IC can, after acquiring the actual coverage scope and coverage amount of the electrically conductive liquid on the touch screen surface, identify the numerical ranges respectively corresponding to the acquired actual coverage scope and coverage amount, and identify the interference level corresponding to the identified numeral ranges.

In the following example, the electrically conductive liquid is water.

In case that there is no water or there is thin water mist on the touch screen surface, the Touch IC can identify the interference level of water as the first interference level. The water mist consists of a plurality of indiscernible water drops. For example, the interference level of water can be identified as the first interference level if the actual coverage scope of water on the touch screen surface is relatively large but the coverage amount is less than a first threshold value. In an exemplary embodiment, the first threshold value can be set between 0.25 ml and 0.5 ml.

In case that there are small water drops on the touch screen surface, the Touch IC can identify the interference level of water as the second interference level. For example, the interference level of water can be identified as the second interference level if the actual coverage scope of water on the touch screen surface is relatively small but the coverage amount reaches the first threshold value.

In case that there is thick water mist on the touch screen surface, the Touch IC can identify the interference level of water as the third interference level. For example, the interference level of water can be identified as the third interference level if the actual coverage scope of water on the touch screen surface is relatively large and the coverage amount reaches the second threshold value. The second threshold value is not smaller than the first threshold value.

In case that there are large water drops or a water film on the touch screen surface, the Touch IC can identify the interference level of water as the fourth interference level. The water film can be a continuous and uninterrupted water layer. For example, the interference level of water can be identified as the fourth interference level if the actual coverage scope of water on the touch screen surface is relatively large and the coverage amount reaches a third threshold value. The third threshold value is greater than the second threshold value.

It should be noted that the number of interference levels can be set according to the actual situation and, in the above embodiment, four interference levels are set for illustrative purposes only. The embodiment of the disclosure does not limit the number of interference levels.

It should be also noted that, as touch screens of different electronic equipment may have different sizes, the numerical range of the actual coverage scope and the numerical range of the coverage amount may be different in different interference level. In an actual application, the above numerical ranges can be set on the basis of sizes of touch screens of electronic equipment in combination with experiments, to which the embodiment of the disclosure makes no restriction.

In step 203, the touch screen is controlled under an operation mode corresponding to the interference level. In one exemplary embodiment, step 203 may include the following substeps.

In a first substep, the operation mode is selected from a plurality of operation modes based on a predetermined correspondence relationship, to correspond to the interference level.

For example, the predetermined correspondence relationship includes correspondence relationships between the interference levels and the operation modes. The operation modes include at least one of a full-screen multi-finger operation mode, a multi-finger and single-finger mixed operation mode, a full-screen single-finger operation mode, and a full-screen shut-down operation mode.

In the full-screen multi-finger operation mode, the whole touch screen supports multi-finger touch. In the multi-finger and single-finger mixed operation mode, a region of the touch screen outside the coverage scope of the electrically conductive liquid supports multi-finger touch, while a region of the touch screen within the coverage scope of the electrically conductive liquid supports single-finger touch. In the full-screen single-finger operation mode, the whole touch screen only supports single-finger touch. In the full screen shut-down operation mode, the whole touch screen does not support any touch operation, and the Touch IC stops reporting touch information to a central processing unit (CPU) of the electronic equipment.

When the interference levels of the electrically conductive liquid include the first interference level, the second interference level, the third interference level, and the fourth interference level with increasing interference degrees, the first substep is implemented as follows, according to an exemplary embodiment.

The full-screen multi-finger operation mode is selected based on the predetermined correspondence relationship when the interference level of the electrically conductive liquid is the first interference level. The first interference level has the lowest interference degree. Under such circumstances, the electrically conductive liquid has few or even no interference on touch operation, therefore the Touch IC still can accurately detect single-point touch and multi-point touch by mutual capacitance scanning or by a combination of mutual capacitance scanning and self-capacitance scanning. Therefore, when the interference level of the electrically conductive liquid is the first interference level, the Touch IC selects the fun-screen multi-finger operation mode so as to ensure normal detection of the user's multi-finger touch.

The multi-finger and single-finger mixed operation mode is selected based on the predetermined correspondence relationship when the interference level of the electrically conductive liquid is the second interference level. Compared with the first interference level, the interference degree of the second interference level is higher. Under such circumstances, the multi-finger and single-finger mixed operation mode is selected. For example, when the user's fingers touch the screen in a region beyond the coverage scope of the electrically conductive liquid, the Touch IC still can accurately detect single-point touch and multi-point touch by mutual capacitance scanning or by a combination of mutual capacitance scanning and self-capacitance scanning. When the user's fingers touch the screen in a region within the coverage scope of the electrically conductive liquid, a change of the self-capacitance value caused by the finger touch can be stably monitored by the Touch IC, but a change of the mutual capacitance value caused by the finger touch is difficult to be stably monitored by the Touch IC because the mutual capacitance value is significantly affected by the electrically conductive liquid. Therefore, the Touch IC can make normal detection of the user's single-finger touch by self-capacitance scanning so as to ensure normal detection of a single-finger operation such as clicking, sliding, and the like.

The full-screen single-finger operation mode is selected based on the predetermined correspondence relationship when the interference level of the electrically conductive liquid is the third interference level. Compared with the second interference level, the interference degree of the third interference level is higher. Under such circumstances, the fall-screen single-finger operation mode is selected so that the Touch IC can make a detection of the users single-finger touch by self-capacitance scanning so as to ensure the detection accuracy of a single-finger operation such as clicking, sliding, and the like.

The full-screen shut-down operation mode is selected based on the predetermined correspondence relationship when the interference level of the electrically conductive liquid is the fourth interference level. The fourth interference level has the highest interference degree. Under such circumstances, the electrically conductive liquid may seriously affect single-finger touch and multi-finger touch. The Touch IC selects the full-screen shut-down operation mode and stops reporting touch information to the CPU in order to prevent the Touch IC from reporting wrong touch information to the CPU, which may cause the CPU to carry out misoperation on the basis of the wrong touch information.

In a second substep, the touch screen is controlled under the selected operation mode. For example, the touch screen is controlled under the selected operation mode after the Touch IC selects the operation mode, to correspond to the interference level, based on the predetermined correspondence relationship.

In the illustrated embodiment, it is assumed that the multi-finger and single-finger mixed operation mode is selected in step 203. Accordingly, in step 204, the touch screen is controlled under the multi-finger operation mode when the touch screen is under the multi-finger and single-finger mixed operation mode. Tinder the multi-finger and single-finger mixed operation mode, the Touch IC firstly controls the touch screen under the multi-finger operation mode, the multi-finger operation mode supporting the user's multi-finger touch operation.

In step 205, a touch position corresponding to at least one finger is acquired by mutual capacitance scanning. Under the multi-finger operation mode, normal detection of the multi-finger touch operation and the single-finger touch operation can be conducted by mutual capacitance scanning or by a combination of mutual capacitance scanning and self-capacitance scanning, and the touch position corresponding to each finger can be acquired.

In step 206, it is detected whether any touch position is in a scope of the electrically conductive liquid. The scope of the electrically conductive liquid is determined by enlarging the area of the actual coverage scope of the electrically conductive liquid on the touch screen surface. When the area of the scope of the electrically conductive liquid is appropriately larger than that of the actual coverage scope, it is ensured that the touching of the electrically conductive liquid by the finger can be pre-evaluated, so as to continuously and accurately acquire the touch position corresponding to the finger in the subsequent process.

In step 207, the touch screen is controlled to switch from the multi-finger operation mode to the single-finger operation mode if any touch position is in the scope of the electrically conductive liquid. The single-finger operation mode supports the user's single-finger touch operation. Under the single-finger operation mode, normal detection of the single-finger touch operation can be conducted by self-capacitance scanning.

In step 208, at least one touch position associated with the touch position that is in the scope of the electrically conductive liquid is acquired by self-capacitance scanning.

In exemplary embodiments, after step 203 is performed, the Touch IC can report the current operation mode of the touch screen to the CPU of the electronic equipment, so that the CPU can generate a prompt message. The prompt message is used for prompting the current operation mode of the touch screen so that the user can know the current operation mode of the touch screen according to the prompt message. Also, the user can know whether there is an electrically conductive liquid on the touch screen surface according to the prompt message, thus can timely remove the electrically conductive liquid so as to prevent the electrically conductive liquid from interfering the user's normal touch operation.

Figure 3:
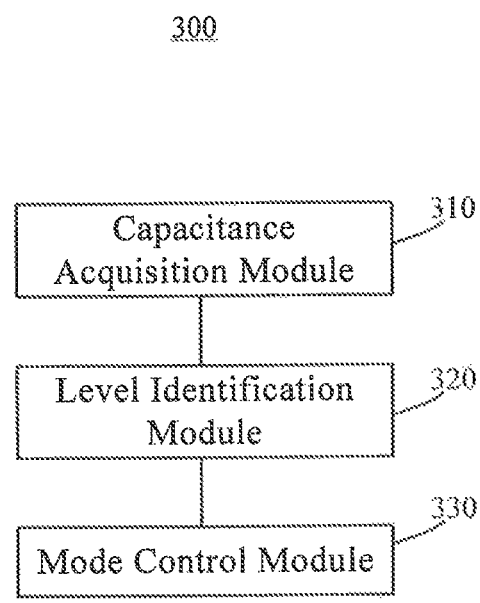
FIG. 3 is a block diagram of a touch screen control device, according to an exemplary embodiment.

FIG. 3 is a block diagram of a touch screen control device 300, according to an exemplary embodiment. The touch screen control device 300 can be implemented by software, hardware, or a combination of both to be a part or all of a piece of electronic equipment. The touch screen control device 300 may include a capacitance acquisition module 310, a level identification module 320, and a mode control module 330.

The capacitance acquisition module 310 is configured to acquire actual capacitance values of respective test points on a touch screen.

The level identification module 320 is configured to identify an interference level of an electrically conductive liquid according to differences between the actual capacitance values and a plurality of reference capacitance values of the respective test points, the reference capacitance values being acquired when the test points are not influenced by an electrically conductive medium.

The mode control module 330 is configured to control the touch screen under an operation mode corresponding to the interference level.

Figure 4:
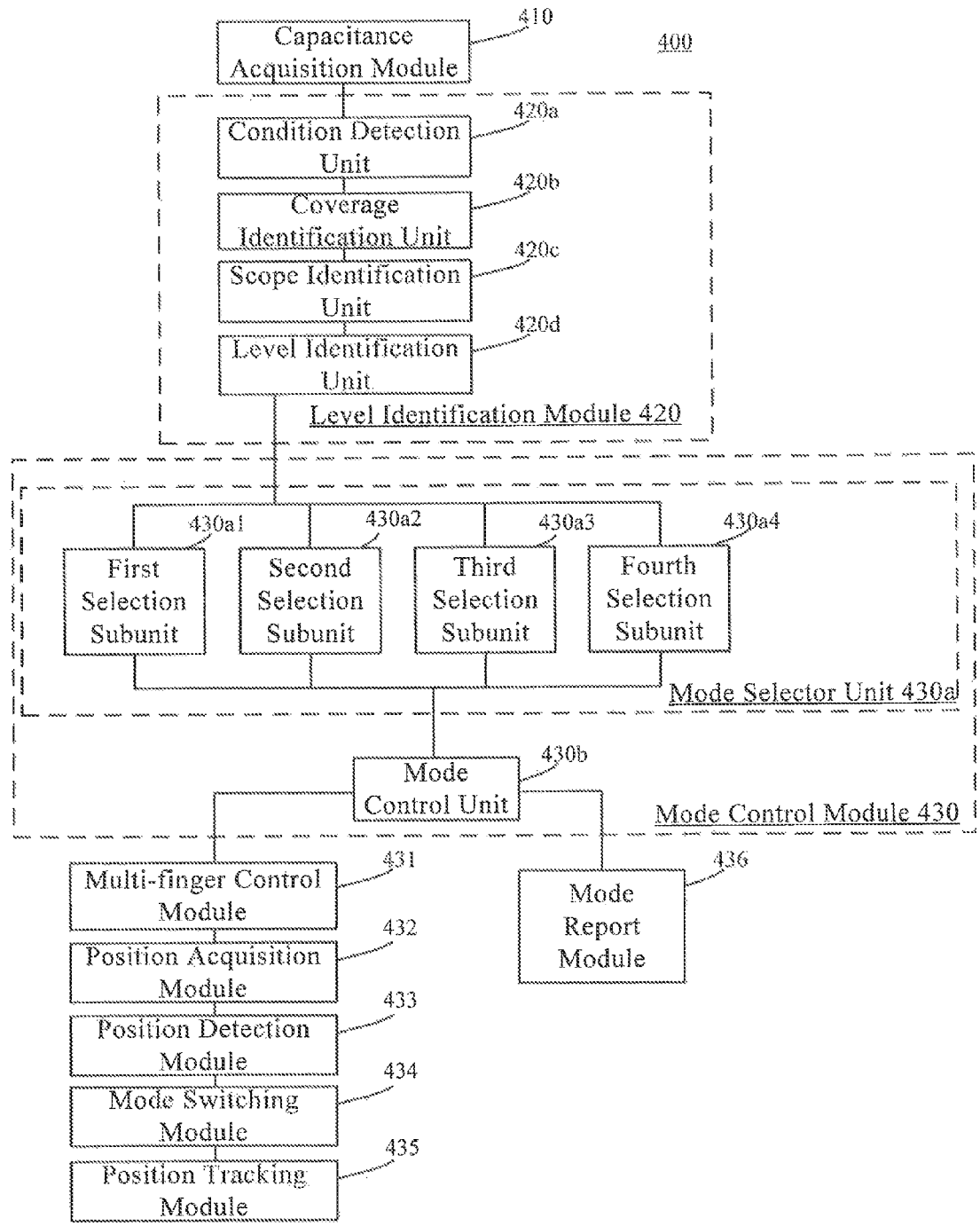
FIG. 4 is a block diagram of a touch screen control device, according to an exemplary embodiment.

FIG. 4 is a block diagram of a touch screen control device 400, according to another exemplary embodiment. The touch screen control device 400 can be implemented by software, hardware, or a combination of both to be a part or all of a piece of electronic equipment. The touch screen control device 400 may include a capacitance acquisition module 410, a level identification module 420, and a mode control module 430.

The capacitance acquisition module 410 is configured to acquire actual capacitance values of respective test points on a touch screen.

The level identification module 420 is configured to identify the interference level of an electrically conductive liquid based on differences between the actual capacitance values and a plurality of reference capacitance values of the respective test points, the reference capacitance values being acquired when the test points are not influenced by an electrically conductive medium.

The level identification module 420 includes a condition detection unit 420a, a coverage identification unit 420b, a scope identification unit 420c, and a level identification unit 420d.

The condition detection unit 420a is configured to detect whether each of the test points meets a predetermined condition. The predetermined condition includes the actual self-capacitance value of the test point is the same as the reference self-capacitance value of the test point, and the actual mutual capacitance value of the test point is different from the reference mutual capacitance value of the test point. The reference self-capacitance value of the test point refers to a self-capacitance value of the test point acquired when the test point is not influenced by the electrically conductive medium, and the reference mutual capacitance value of the test point refers to a mutual capacitance value of the test point acquired when the test point is not influenced by the electrically conductive medium.

The coverage identification unit 420b is configured to determine that, if a test point meets the predetermined condition, the test point surface is covered with the electrically conductive liquid, and, according to the difference between the actual mutual capacitance value and the reference mutual capacitance value of the test point, identify the coverage amount of the electrically conductive liquid on the surface of the test point. The difference is positively related to the coverage amount.

The scope identification unit 420c is configured to identify an actual coverage scope and an actual coverage amount of the electrically conductive liquid on the touch screen surface according to whether the surface of each test point is covered with the electrically conductive liquid and the coverage amount of the electrically conductive liquid on the surface of the test point that is covered with the electrically conductive liquid.

The level identification unit 420d is configured to identify the interference level of the electrically conductive liquid according to the actual coverage scope and the coverage amount of the electrically conductive liquid on the touch screen surface.

The mode control module 430 is configured to control the touch screen under an operation mode corresponding to the interference level. The mode control module 430 includes a mode selection unit 430a and a mode control unit 430b.

The mode selection unit 430a is configured for selecting, from a plurality of operation modes based on a predetermined correspondence relationship, the operation mode corresponding to the interference level. The predetermined correspondence relationship includes correspondence relationships between interference levels and operation modes, the operation modes including at least one of a full-screen multi-finger operation mode, a multi-finger and single-finger mixed operation mode, a full-screen single-finger operation mode, and a full-screen shut-down operation mode.

The mode selection unit 430a includes at least one of a first selection subunit 430a1, a second selection subunit 430a2, a third selection subunit 430a3, and a fourth selection subunit 430a4. The interference levels may include a first interference level, a second interference level, a third interference level, and a fourth interference level with increasing interference degrees.

The first selection subunit 430a1 is configured to select, based on the predetermined correspondence relationship, the full-screen multi-finger operation mode when the interference level of the electrically conductive liquid is the first interference level. The second selection subunit 430a2 is configured to select, based on the predetermined correspondence relationship, the multi-finger and single-finger mixed operation mode when the interference level of the electrically conductive liquid is the second interference level. The third selection subunit 430a3 is configured to select, based on the predetermined correspondence relationship, the full-screen single-finger operation mode when the interference level of the electrically conductive liquid is the third interference level. The fourth selection subunit 430a4 is configured to select, based on the predetermined correspondence relationship, the full-screen shut-down operation mode when the interference level of the electrically conductive liquid is the fourth interference level.

The mode control unit 430b is configured to control the touch screen under the selected operation mode.

Optionally, the device 400 also includes a multi-finger control module 431, a position acquisition module 432, a position detection module 433, a mode switching module 434, and a position tracking module 435.

The multi-finger control module 431 is configured to control the touch screen under the multi-finger operation mode when the touch screen is under the multi-finger and single-finger mixed operation mode.

The position acquisition module 432 is configured to acquire a touch position corresponding to at least one finger by mutual capacitance scanning.

The position detection module 433 is configured to detect whether any touch position enters the scope of the electrically conductive liquid. The scope of the electrically conductive liquid is determined according to the actual coverage scope of the electrically conductive liquid on the touch screen surface. An area of the scope of the electrically conductive liquid is larger than that of the actual coverage scope.

The mode switching module 434 is configured to control the touch screen to switch from the multi-finger operation mode to the single-finger operation mode if any touch position is in the scope of the electrically conductive liquid.

The position tracking module 435 is configured to acquire at least one touch position associated with the touch position that is in the scope of the electrically conductive liquid by self-capacitance scanning.

Optionally, the device 400 also includes a mode report module 436.

The mode report module 436 is configured to report the current operation mode of the touch screen to a CPU of the electronic equipment, so that the CPU can generate a prompt message which is used for prompting the current operation mode of the touch screen.

Figure 5:
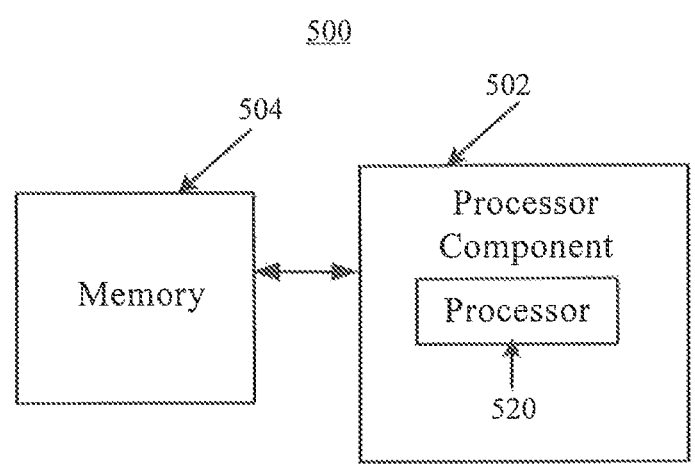
FIG. 5 is a block diagram of a device, according to an exemplary embodiment.

FIG. 5 is a block diagram of a device 500 for controlling a touch screen, according to an exemplary embodiment. For example, the device 500 may be a Touch IC. Referring to FIG. 5, the device 500 may include a processor component 502 and a memory 504.

The processor component 502 usually controls the overall operation of the device 500, for example, acquiring the capacitance values of respective test points on a touch screen of the device 500, controlling the operation mode of the touch screen, and reporting information to a CPU of the electronic equipment, etc. The processor component 502 may include one or more processors 520 for executing instructions so as to carry out steps of the above-described touch screen control methods in part or in whole. In addition, the processor component 502 may include one or more modules for the convenience of interaction between the processor component 502 and other modules.

The memory 504 is configured to store data of different types so as to support the operation of the device 500. Examples of the data include application programs or instructions for operating the device 500. The memory 504 can be implemented by any type of volatile or non-volatile memory devices or a combination thereof. For example, the memory 504 may include at least one of a static random access memory (SRAM), an electrically erasable programmable read-only memory (EEPROM), an erasable programmable read only memory (EPROM), a programmable read-only memory (PROM), read-only memory (ROM), a magnetic memory, a flash memory, a magnetic disk, or an optical disk.

In some exemplary embodiments, the device 500 can be implemented by one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, that are used for executing the touch screen control methods as shown in FIG. 1 or FIG. 2.

In some exemplary embodiments, a non-transitory computer-readable storage medium storing instructions is also provided. For example, the non-transitory computer-readable storage medium may be implemented by the memory 504 of the device 500, which may store instructions that can be executed by the processors 520 of the device 500 so as to perform the touch screen control method as shown in FIG. 1 or FIG. 2. For example, the non-temporary computer-readable storage medium may be a ROM, a random access memory (RAM), a CD-ROM, a magnetic tape, a floppy disk, or an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A touch screen control method, comprising:
acquiring a plurality of actual capacitance values of respective test points on a touch screen;
determining an interference level of an electrically conductive liquid according to differences between the actual capacitance values and a plurality of reference capacitance values of the respective test points, wherein the reference capacitance values are capacitance values of the respective test points when the test points are not influenced by an electrically conductive medium;
selecting an operation mode from a plurality of operation modes based on a predetermined correspondence relationship between a plurality of interference levels and the plurality of operation modes, to correspond to the interference level; and
controlling the touch screen under the operation mode corresponding to the interference level,
wherein the plurality of operation modes include at least one of a full-screen multi-finger operation mode, a multi-finger and single-finger mixed operation mode, a full-screen single-finger operation mode, or a full-screen shut-down operation mode,
the plurality of interference levels include a first interference level, a second interference level, a third interference level, and a fourth interference level with increasing interference degrees, and
the selecting of the operation mode comprises:
selecting the full-screen multi-finger operation mode when the interference level of the electrically conductive liquid is the first interference level;
selecting the multi-finger and single-finger mixed operation mode when the interference level of the electrically conductive liquid is the second interference level;
selecting the full-screen single-finger operation mode when the interference level of the electrically conductive liquid is the third interference level; and
selecting the full-screen shut-down operation mode when the interference level of the electrically conductive liquid is the fourth interference level.

2. The method of claim 1, wherein the determining of the interference level of the electrically conductive liquid comprises:
detecting whether each of the test points meets a predetermined condition, the predetermined condition including that an actual self-capacitance value of the test point is the same as a reference self-capacitance value of the test point, and an actual mutual capacitance value of the test point is different from a reference mutual capacitance value of the test point;
identifying that a surface of the test point is covered with the electrically conductive liquid if the test point meets the predetermined condition, and according to a difference between the actual mutual capacitance value and the reference mutual capacitance value of the test point, identifying a coverage amount of the electrically conductive liquid on the surface of the test point, the difference being positively related to the coverage amount of the electrically conductive liquid on the surface of the test point;

according to whether the surface of each test point is covered with the electrically conductive liquid and the coverage amount of the electrically conductive liquid on the surface of each of the test points that are covered with the electrically conductive liquid, identifying an actual coverage scope and an actual coverage amount of the electrically conductive liquid on a surface of the touch screen; and according to the actual coverage scope and the actual coverage amount of the electrically conductive liquid on the surface of the touch screen, identifying the interference level of the electrically conductive liquid.

3. The method of claim 2, further comprising:
reporting a current operation mode of the touch screen to a central processing unit (CPU) of electronic equipment, the CPU being configured to generate a prompt message for prompting the current operation mode of the touch screen.

4. The method of claim 1, further comprising:
controlling the touch screen under the multi-finger operation mode when the multi-finger and single-finger mixed operation mode is selected;
acquiring a touch position corresponding to at least one finger by mutual capacitance scanning;
detecting whether any touch position is in a scope of the electrically conductive liquid, the scope of the electrically conductive liquid being determined according to an actual coverage scope of the electrically conductive liquid on the surface of the touch screen, and an area of the scope of the electrically conductive liquid being larger than that of the actual coverage scope;
controlling the touch screen to switch from the multi-finger operation mode to the single-finger operation mode if any touch position is in the scope of the electrically conductive liquid; and
acquiring at least one touch position associated with the touch position in the scope of the electrically conductive liquid by self-capacitance scanning.

5. The method of claim 1, further comprising:
reporting a current operation mode of the touch screen to a central processing unit (CPU) of electronic equipment, the CPU being configured to generate a prompt message for prompting the current operation mode of the touch screen.

6. A touch screen control device, comprising:
a processor;
a memory configured to store instructions executable by the processor;
wherein the processor is configured to perform:
acquiring a plurality of actual capacitance values of respective test points on a touch screen;
identifying an interference level of an electrically conductive liquid according to differences between the actual capacitance values and a plurality of reference capacitance values of the respective test points, wherein the reference capacitance values are capacitance values of the respective test points when the test points are not influenced by an electrically conductive medium;
selecting an operation mode from a plurality of operation modes based on a predetermined correspondence relationship between a plurality of interference levels and the plurality of operation modes, to correspond to the interference level; and
controlling the touch screen under the operation mode corresponding to the interference level,
wherein the plurality of operation modes include at least one of a full-screen multi-finger operation mode, a multi-finger and single-finger mixed operation mode, a full-screen single-finger operation mode, and a full-screen shut-down operation mode,
the plurality of interference levels include a first interference level, a second interference level, a third interference level, and a fourth interference level with increasing interference degrees, and
the selecting of the operation mode comprises:
selecting the full-screen multi-finger operation mode when the interference level of the electrically conductive liquid is the first interference level;
selecting the multi-finger and single-finger mixed operation mode when the interference level of the electrically conductive liquid is the second interference level;
selecting the full-screen single-finger operation mode when the interference level of the electrically conductive liquid is the third interference level; and
selecting the full-screen shut-down operation mode when the interference level of the electrically conductive liquid is the fourth interference level.

7. The device of claim 6, wherein the identifying of the interference level of the electrically conductive liquid comprises:
detecting whether each of the test points meets a predetermined condition, the predetermined condition including an actual self-capacitance value of the test point is the same as a reference self-capacitance value of the test point, and an actual mutual capacitance value of the test point is different from a reference mutual capacitance value of the test point;
identifying that a surface of the test point is covered with the electrically conductive liquid if the test point meets the predetermined condition, and according to a difference between the actual mutual capacitance value and the reference mutual capacitance value of the test point, identifying a coverage amount of the electrically conductive liquid on the surface of the test point, the difference being positively related to the coverage amount of the electrically conductive liquid on the surface of the test point;
according to whether the surface of each test point is covered with the electrically conductive liquid and the coverage amount of the electrically conductive liquid on the surface of each of the test points that are covered with the electrically conductive liquid, identifying an actual coverage scope and an actual coverage amount of the electrically conductive liquid on a surface of the touch screen; and
according to the actual coverage scope and the actual coverage amount of the electrically conductive liquid on the surface of the touch screen, identifying the interference level of the electrically conductive liquid.

8. The device of claim 7, wherein the processor is further configured to perform:
reporting a current operation mode of the touch screen to a central processing unit (CPU) of electronic equipment, the CPU being configured to generate a prompt message for prompting the current operation mode of the touch screen.

9. The device of claim 6, wherein the processor is further configured to perform:
controlling the touch screen under the multi-finger operation mode when the multi-finger and single-finger mixed operation mode is selected;

acquiring a touch position corresponding to at least one finger by mutual capacitance scanning;

detecting whether any touch position is in a scope of the electrically conductive liquid, the scope of the electrically conductive liquid being determined according to an actual coverage scope of the electrically conductive liquid on the surface of the touch screen, and an area of the scope of the electrically conductive liquid being larger than that of the actual coverage scope;

controlling the touch screen to switch from the multi-finger operation mode to the single-finger operation mode if any touch position is in the scope of the electrically conductive liquid; and acquiring at least one touch position associated with the touch position in the scope of the electrically conductive liquid by self-capacitance scanning.

10. The device of claim 6, wherein the processor is further configured to perform:

reporting a current operation mode of the touch screen to a central processing unit (CPU) of electronic equipment, the CPU being configured to generate a prompt message for prompting the current operation mode of the touch screen.

11. A non-transitory computer-readable storage medium having stored therein instructions that, when executed by a processor of a device, cause the device to perform a touch screen control method, the method comprising:

acquiring a plurality of actual capacitance values of respective test points on a touch screen;

identifying an interference level of an electrically conductive liquid according to differences between the actual capacitance values and a plurality of reference capacitance values of the respective test points, wherein the reference capacitance values are capacitance values of the respective test points when the test points are not influenced by an electrically conductive medium;

selecting an operation mode from a plurality of operation modes based on a predetermined correspondence relationship between a plurality of interference levels and the plurality of operation modes, to correspond to the interference level; and controlling the touch screen under the operation mode corresponding to the interference level, wherein the plurality of operation modes include at least one of a full-screen multi-finger operation mode, a multi-finger and single-finger mixed operation mode, a full-screen single-finger operation mode, and a full-screen shut-down operation mode, the plurality of interference levels include a first interference level, a second interference level, a third interference level, and a fourth interference level with increasing interference degrees, and the selecting of the operation mode comprises:

selecting the full-screen multi-finger operation mode when the interference level of the electrically conductive liquid is the first interference level;

selecting the multi-finger and single-finger mixed operation mode when the interference level of the electrically conductive liquid is the second interference level;

selecting the full-screen single-finger operation mode when the interference level of the electrically conductive liquid is the third interference level; and selecting the full-screen shut-down operation mode when the interference level of the electrically conductive liquid is the fourth interference level.

12. The medium of claim 11, wherein the identifying of the interference level of the electrically conductive liquid comprises:

detecting whether each of the test points meets a predetermined condition, the predetermined condition including an actual self-capacitance value of the test point is the same as a reference self-capacitance value of the test point, and an actual mutual capacitance value of the test point is different from a reference mutual capacitance value of the test point;

identifying that a surface of the test point is covered with the electrically conductive liquid if the test point meets the predetermined condition, and according to a difference between the actual mutual capacitance value and the reference mutual capacitance value of the test point, identifying a coverage amount of the electrically conductive liquid on the surface of the test point, the difference being positively related to the coverage amount of the electrically conductive liquid on the surface of the test point;

according to whether the surface of the each test point is covered with the electrically conductive liquid and the coverage amount of the electrically conductive liquid on the surface of each of the test points that are covered with the electrically conductive liquid, identifying an actual coverage scope and an actual coverage amount of the electrically conductive liquid on a surface of the touch screen; and according to the actual coverage scope and the actual coverage amount of the electrically conductive liquid on the surface of the touch screen, identifying the interference level of the electrically conductive liquid.

13. The medium of claim 11, wherein the method further comprises:

controlling the touch screen under the multi-finger operation mode when the multi-finger and single-finger mixed operation mode is selected;

acquiring a touch position corresponding to at least one finger by mutual capacitance scanning;

detecting whether any touch position is in a scope of the electrically conductive liquid, the scope of the electrically conductive liquid being determined according to an actual coverage scope of the electrically conductive liquid on the surface of the touch screen, and an area of the scope of the electrically conductive liquid being larger than that of the actual coverage scope;

controlling the touch screen to switch from the multi-finger operation mode to the single-finger operation mode if any touch position is in the scope of the electrically conductive liquid; and acquiring at least one touch position associated with the touch position in the scope of the electrically conductive liquid by self-capacitance scanning.

14. The medium of claim 11, wherein the method further comprises:

reporting a current operation mode of the touch screen to a central processing unit (CPU) of electronic equipment, the CPU being configured to generate a prompt message for prompting the current operation mode of the touch screen.

* * * * *